United States Patent [19]

Getzlaff et al.

[11] Patent Number: 5,311,519
[45] Date of Patent: May 10, 1994

[54] MULTIPLEXER

[75] Inventors: Klaus J. Getzlaff, Schönaich; Thomas Pflueger, Leinfelden; Hans-Werner Tast, Weil im Schonbuch, all of Fed. Rep. of Germany

[73] Assignee: International Business Machines Corporation, Armonk, N.Y.

[21] Appl. No.: 871,160

[22] Filed: Apr. 20, 1992

[30] Foreign Application Priority Data

Jul. 6, 1991 [EP]  European Pat. Off. ............ 91111294

[51] Int. Cl.⁵ .................................................. H04J 3/04
[52] U.S. Cl. ..................................... 370/112; 307/445; 365/189.02
[58] Field of Search .................... 370/112; 340/825.03, 340/826; 365/189.02, 230.02; 328/152; 307/445

[56] References Cited

U.S. PATENT DOCUMENTS

| | | | |
|---|---|---|---|
| 4,878,200 | 10/1989 | Asghar et al. | 365/189.02 |
| 4,903,240 | 2/1990 | Von Flue | 365/189.02 |
| 5,003,475 | 3/1991 | Kerber et al. | 365/230.02 X |

FOREIGN PATENT DOCUMENTS

| | | | |
|---|---|---|---|
| 0262636 | 4/1988 | European Pat. Off. | G06F 7/00 |
| 8404644 | 11/1984 | World Int. Prop. O. | H04Q 3/68 |

OTHER PUBLICATIONS

IBM TDB, vol. 17, No. 6, Nov. 1974, C. Hanna et al., "Bit Manipulator", pp. 1575-1576.

Proceedings IEEE of the International Conference of Telecommunication, Paper 39D, Jun. 17, 1974, Minneapolis, G. Hanke, "PCM Receiving Equipment of a 640 mbits/s Waveguide Transmission System Using Integrated Circuits" pp. 1-5.

Primary Examiner—Douglas W. Olms
Assistant Examiner—Russell W. Blum
Attorney, Agent, or Firm—Arthur J. Samodovitz

[57] ABSTRACT

A multiplexer circuit which is built up from a series of smaller submultiplexers (241-247, 251-254). It selects a number of adjacent bits, bytes or words from one register and places them in the same order in a second register. The multiplexer can be used in cache memories or instruction buffers.

12 Claims, 4 Drawing Sheets

MULTIPLEXER

FIELD OF THE INVENTIONS

These inventions relate to computers and computer systems and particularly to a multiplexer which selects a number of adjacent bits, bytes, half words or words from one register and places them in the same order in a second register.

BACKGROUND OF THE INVENTION

A conventional multiplexer for selecting four bits out of 16 bits is shown schematically in FIG. 1. Each of the subsections 131–134 of the four bit register 130 is connected by lines 140, 150 to each of the subsections 111–126 of the sixteen bit register 110. For clarity on the figure, only those lines 140 which connect subsection 131 of the four bit register 130 to each of the subsections 111–126 of the sixteen bit register 110 and those lines 150 which connect the subsection 126 of the sixteen bit register 110 to each of the subsections 131–134 of the four bit register 130 are shown. In an actual implementation, however, each of the subsections 111–126 of the sixteen bit register 110 would have four outputs, each going to one of the subsections 131–134 of the four bit register 130, and each of the subsections 131–134 of the four bit register 130 will have sixteen inputs, each coming from one of the subsections 111–126 of the sixteen bit register 110. On FIG. 1, one line, that connecting subsection 126 of the sixteen bit register 110 with subsection 131 of the four bit register 130, is shown as being part of both groups of lines 140, 150.

The logical implementation of part of this structure is shown in FIG. 2. Each of the subsections 111–126 of the sixteen bit register 110 is connected to a first input of one of the AND gates 161–176. The second input to the AND gates 161–176 is from a multiplexer controller (not shown). The outputs of the AND gates 161–164 are connected to the inputs of the four input OR gate 181. The outputs of the AND gates 165–168 are connected to the inputs of the four input OR gate 182. The outputs of the AND gates 169–172 are connected to the inputs of the four input OR gate 183. The outputs of the AND gates 173–176 are connected to the inputs of the four input OR gate 184. Each of the outputs of the OR gates 181–184 are connected to a different one of the inputs of the four input OR gate 185. The output 160 of the OR gate 185 is connected to the input of one of the subsections 131–134 of the four bit register 130. The whole circuit of FIG. 2 is repeated four times in the multiplexer as each of outputs 160 is connected to only one of the subsections 131–134 of the four bit register 130. If it is then desired to transfer one of the bit values from one of the subsections 111–126 of the sixteen bit register 110 to one of the subsections 131–134 of the four bit register 130, then a high signal is placed by the multiplexer controller on the second input of the corresponding AND gate 161–176 and the desired bit value appears at the output 160 from whence it can be passed into the one of the subsections 131–134 of the four bit register 130 to which the multiplexer is connected.

This design has the disadvantage in that it contains a large amount of redundant wiring and logic gates. For example, each of subsections 111–126 of the sixteen bit register 110 can be connected through the appropriate logic gates to all of the subsections 131–134 of the four bit register 130 even though; in some applications, the value of the bit in a subsection 111–126 of the sixteen bit register 110 will be passed to only one of the subsections 131–134 of the four bit register 130. The effect of this redundant wiring is to slow down the operation of the multiplexer as the lines are longer than they need to be and there is a surplus load on the each of the subsections 111–126 of the sixteen bit register 110. In addition, the redundant logic gates use a great deal of space on the chip which could be better employed.

SUMMARY OF THE INVENTION

The object of the invention is therefore to produce a multiplexer circuit design in which the amount of wiring in the circuit is decreased, the load on the first or output register is decreased and the number of logic gates required reduced.

This object is achieved by realizing that, for the applications for which this circuit is required, the bytes which are selected are contiguous, i.e. in adjacent subsections of the register. Thus, it is not necessary for the output of every subsection of the first register, i.e. the register from which the bits are taken, to be connected simultaneously to every subsection of the second register, i.e. the register into which the bits are placed. Conversely, it is not necessary for the inputs of all of the subsections of the second register to be connected simultaneously to all of the outputs of the subsections of the first register. All that is required is for adjacent subsections of the first register to be connected simultaneously to adjacent subsections of the second subregister. Further details of the construction of the circuit include a multiplexing circuit including location register circuit for locating contiguous bytes in adjacent subsections of the register, and connection means for simultaneously connecting a second register to all of the outputs of the subsections of the first register. The circuit also has a way for selecting m contiguous information units stored in n adjacent subsections of a first register (210; 410) containing n subsections (211–226) and placing them in a second register (230; 430) containing m subsections (231–234), where m is less than n and n is greater than one, and where there are k logic stages (241–247; 450–452) which each contain $z(x)$ submultiplexers compressing in the ratio $-q(x):1$, where x is a variable from 1 to k, whereby the first logic stage contains between n and $m+[q(k)*q(k-1)* \ldots *q(3)*q(2)]-1$ submultiplexers, the kth logic stage contains m submultiplexers; p the xth logic stage contains between n and $m+[q(k)*q(k-1)* \ldots *q(x+1)]-1$ submultiplexers for $k>x>1$;

the outputs of the kth logic stage submultiplexers are connected to the inputs of the second register (230; 430);

the hth input to the ith submultiplexer in the xth logic stage is connected to the output of the $i+(h-1)*[q(x+1)*q(x+2)* \ldots *q(k)]$ submultiplexer in the previous, (x−1)th, logic stage; and n is less than or equal to the product $q(1)*q(2)* \ldots *q(k-1)*q(k)$.

As well as saving wiring in the multiplexer, the effect of reducing the "fan out" wiring from the first register is also to substantially reduce the number of logic gates required by multiplexer as well as reducing the load on the first register. This leads to a substantial increase in the speed of operation of the multiplexer as well as a large saving in space on the chip in which the multiplexer is incorporated.

The invention can be incorporated into cache memories for selecting the required data from a portion of the cache. The invention can also be used for selecting the required instruction from an Instruction Buffer.

Our detailed description follows as parts explaining our preferred embodiments of our inventions provided by way of example.

DETAILED DESCRIPTION OF THE INVENTIONS

Figure 3:
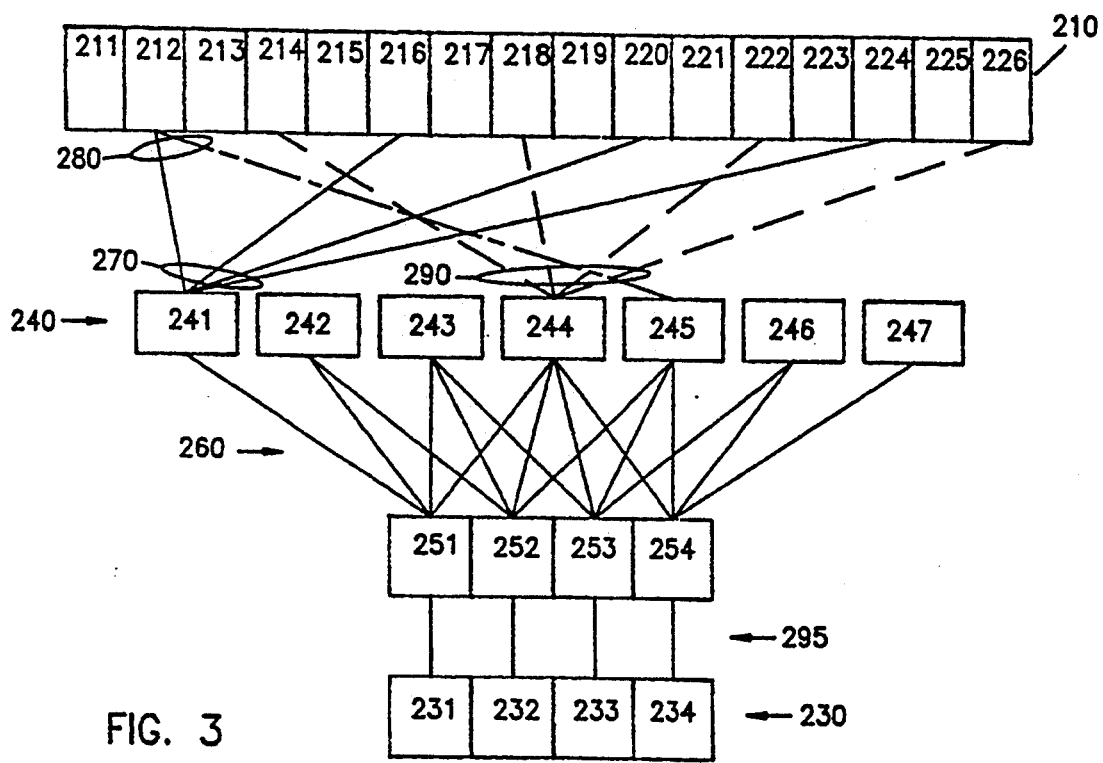
FIG. 3 shows a schematic illustration the multiplexer of the invention.

Turning now to our inventions in greater detail, it will be seen that a schematic illustration of the multiplexer of the preferred embodiment is shown in FIG. 3. In this example, it is assumed that it is wished to select four contiguous bits from a first, sixteen bit register 210 which are to be placed in the second, four bit register 230. The first register 210 is divided into sixteen subsections 211-226, one for each bit, and the second register 230 is divided into four subsections 231-234. The four contiguous bits could be from any four adjacent subsections 211-226 of the sixteen bit register 210, for example in subsections 215 to 218 or, as the register 210 works in 'wrap around' mode, in subsections 225, 226, 211 and 212.

Each of subsections 211-213, 215-217, 219-222, 223-225 of the first register 210 is connected to two of the series of submultiplexers 241-243, 245-247 by lines 280. Similarly submultiplexers 241-243 and 245-247 are each connected by lines 270 to four of the subsections 211-213, 215-217, 219-222, 223-225 of the first register 210. Subsections 214, 218, 222, 226 of the first register 210 are only connected to the submultiplexer 244 by lines 290. Submultiplexer 241 is connected to the inputs of the submultiplexer 251 by one of the lines 260. Submultiplexer 242 is connected to the inputs of the submultiplexers 251, 252 by two of the lines 260. Submultiplexer 243 is connected to the inputs of the submultiplexers 251-253 by three of the lines 260. Submultiplexer 244 is connected to the inputs of all of the submultiplexers 251-254 by four of the lines 260. Submultiplexer 247 is connected to the input of the submultiplexer 254 by one of the lines 260. Submultiplexer 246 is connected to the inputs of the submultiplexers 254, 253 by two of the lines 260. Submultiplexer 245 is connected to the inputs of the submultiplexers 252-254 by three of the lines 260. Each of the submultiplexers 251-254 is connected by lines 260 to four adjacent ones of the submultiplexers 241-247, one of which will always be submultiplexer 244. Each of the submultiplexers 251-254 is connected to the one of the inputs of the corresponding subsections 231-234 of the second register 230 by lines 295. For simplicity only certain ones of the connecting lines 270, 280, 290 are shown on the FIG. 3.

Figure 4:
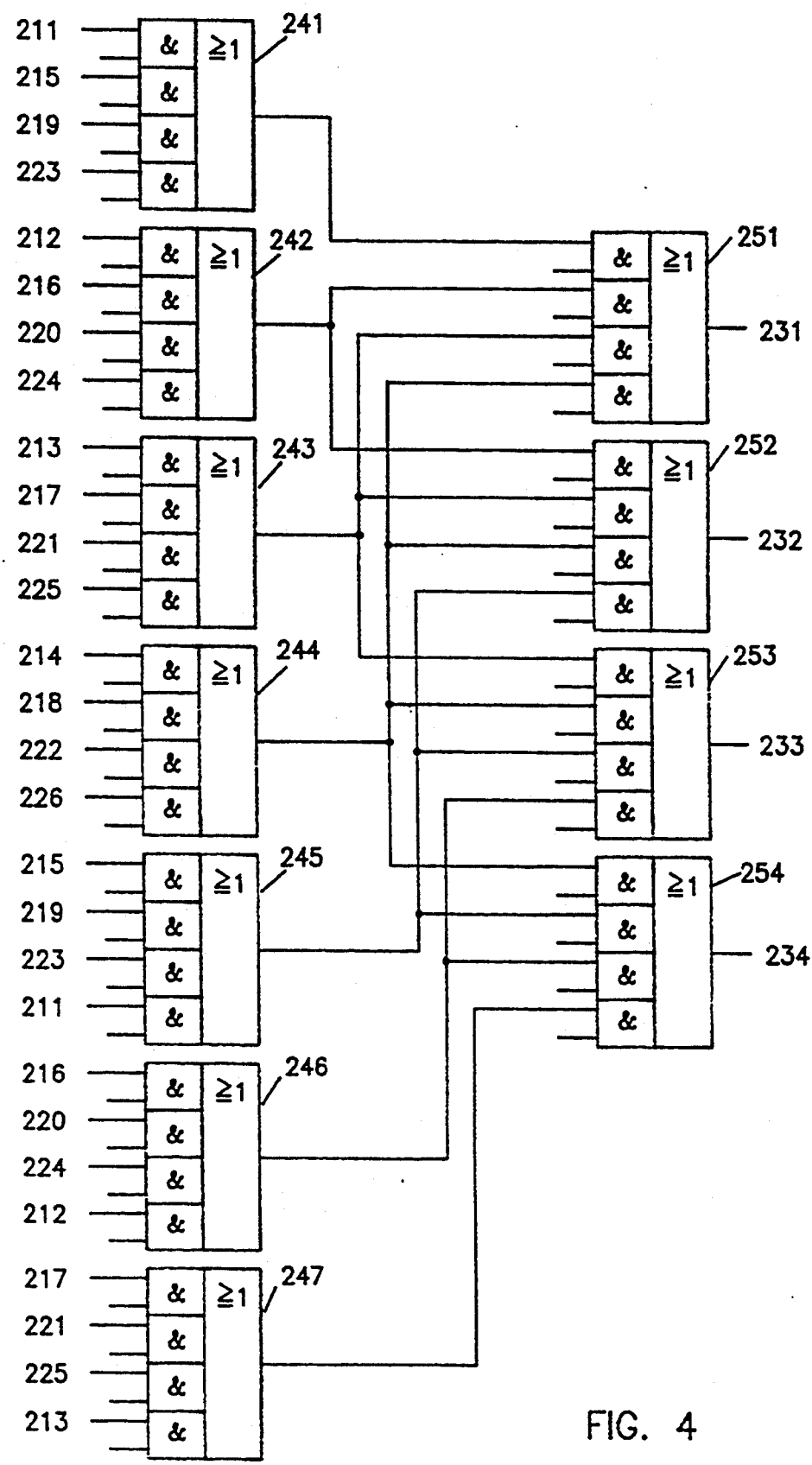
FIG. 4 shows a logical implementation of the multiplexer of the invention.

FIG. 4 shows the logical implementation of FIG. 3. Each of the submultiplexers 241-247 in a first stage is constructed of four AND gates and one four input OR gate. The first input of each of the AND gates is connected to the output of one of the subsections 211-226 of the first register 210, the relevant one of the subsections 211-226 being indicated by its reference sign by the AND gate input. The second input of each of the AND gates comes from the multiplexer controller (not shown). The outputs of the AND gates are passed to the four input OR gate. The outputs of the OR gates form the outputs of the first stage submultiplexers and are connected to the input of the submultiplexers 251-254 in a second stage.

The second stage submultiplexers 251-254 consist of four AND gates and a four input OR gate. The first input of each of these AND gates is connected to the output of one of the first stage submultiplexers 241-247 as described above and the second input is connected to the multiplexer controller (not shown). The outputs of the four AND gates are connected to the inputs of the four input OR gate, whose output is connected to the input of the subsection 231-234 of the second register 230 as indicated by the reference sign on the Figure.

Figure 1:
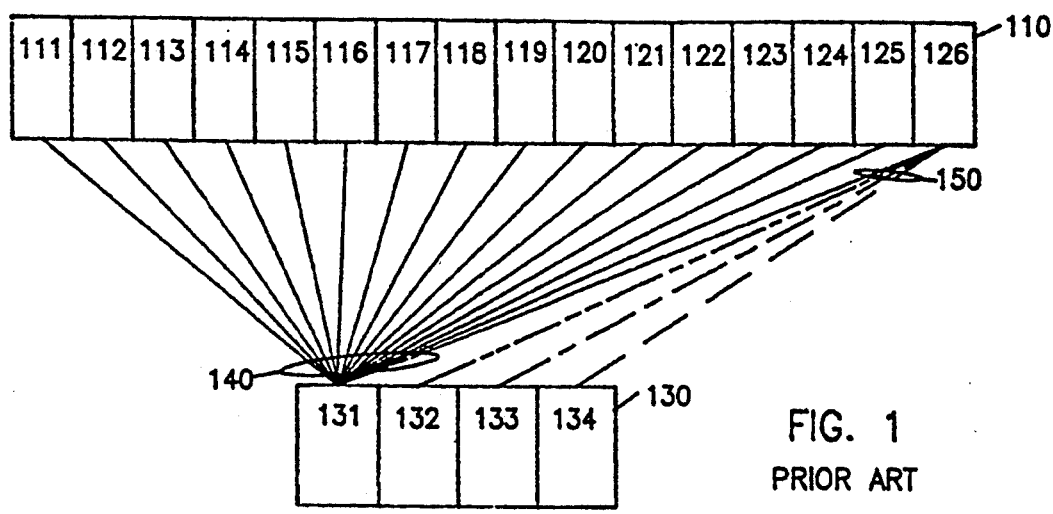
FIG. 1 shows a schematic illustration of a prior art multiplexer.
Figure 2:
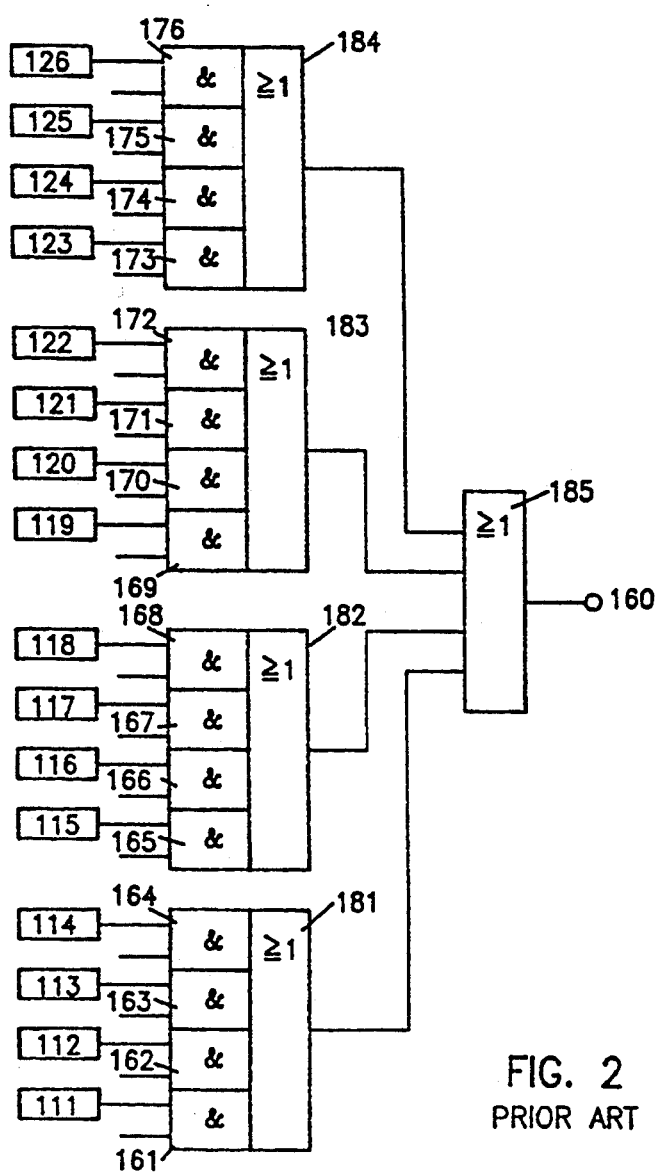
FIG. 2 shows a logical implementation of the prior art multiplexer of FIG. 1.
Figure 5A:
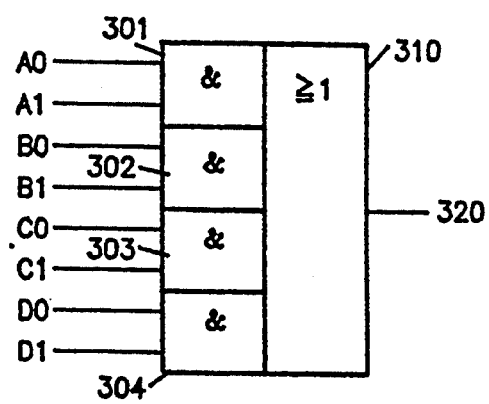
FIGS. 5(A and B) shows a realization of a four input AND/OR gate.
Figure 5B:
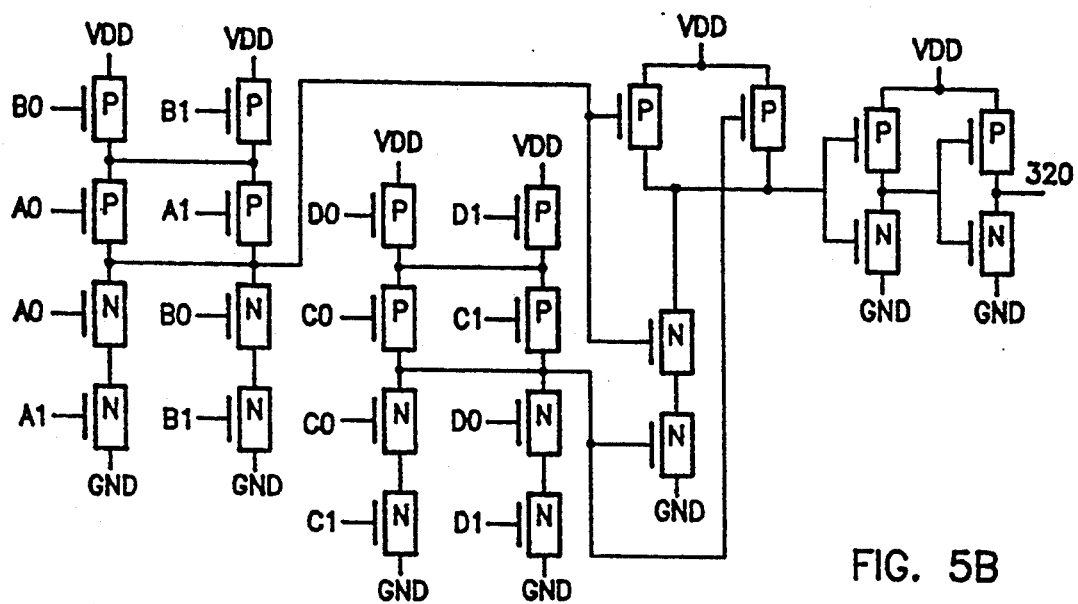
Figure 6:
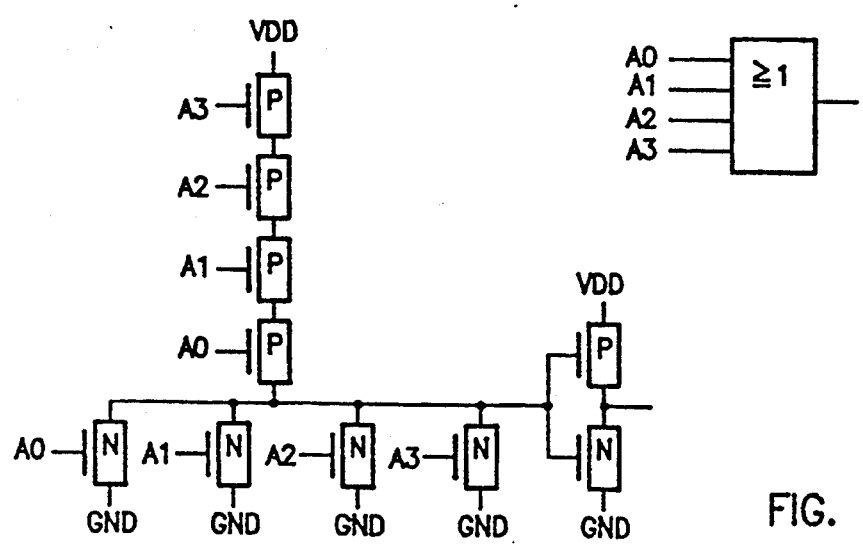
FIG. 6 shows a realization of a four input OR gate.

An illustration of a part of the preferred multiplexer is shown in FIGS. 5A and 5B. FIG. 5A shows the logical design of each of the submultiplexers 241-247, 251-254 of the multiplexer circuit shown in FIG. 4. There are four AND gates 301-304 and one four input OR gate 310. The first inputs to the AND gates are labelled A0, B0, C0 and D0. The second inputs to the AND gates are labelled A1, B1, C1 and D1. The outputs of the AND gates 301-304 are connected to the four input OR gate 310, whose output is labelled 320. In FIG. 5B a circuit diagram is shown which realizes the logical design of FIG. 5A. By following the circuit diagram through, it will be seen that, if any of the input pairs A0:A1, B0:B1, C0:C1, D0:D1 are both 1, then a 1 will appear on the output 320 of the submultiplexer. The circuit requires 12 p-type FETs and 12 n-type FETs for its construction. Thus, for the construction of the complete multiplexer as shown in FIG. 4, a total of 132 n-type FETs and 132 p-type FETs are needed since the submultiplexer circuit is repeated 11 times. This compares to the prior art circuit of FIG. 2 which requires 192 n-type FETs and 192 p-type FETs for the construction of AND/OR logic blocks 161-176, 181-184 and a further 20 n-type FETs and 20 p-type FETs for the construction of the OR gates 185 (as shown in FIG. 6), giving a total of 212 n-type FETs and 212 p-type FETs.

An example will serve to illustrate the operation of the multiplexer. Let us first of all suppose that the values contained in the subsections 214-217 of the first register 210 are to be transferred to the second register 230. This is done by the multiplexer controller (not shown) turning high the second input of the AND gates whose first inputs are connected to the subsection 214 in the submultiplexer 244, the subsection 215 in the submultiplexer 245, the subsection 216 in the submultiplexer 246 and the subsection 217 in the submultiplexer 247. At the output of the submultiplexers 244-247 appears the value contained in the subsections 214-217 respectively. These values are then transferred to the submultiplexers 251-254 by the multiplexer controller (not shown) turning high the second input to the AND gates whose first inputs are connected to the submultiplexer 244 in the submultiplexer 251, the submultiplexer 245 in the submultiplexer 252, the submultiplexer 246 in the submultiplexer 253 and the submultiplexer 247 in the submultiplexer 254. From the submultiplexers 251-254, the values can be transferred along lines 295 to the subsections 231-234 of the second register 230. Other contiguous values can be transferred from the subsections 211-226 of the first register 210 to the subsections 231-234 of the second register by the multiplexer controller turning high the second input of the appropriate AND gate.

The multiplexer circuit was described above in terms of selecting 4 contiguous bits from 16 adjacent subsections 211-226 of a first register 210. The principles can, however, be generalized to selecting any number, m, of contiguous bits from n adjacent subsections of a first register. This principle is illustrated in FIG. 7.

Figure 7:
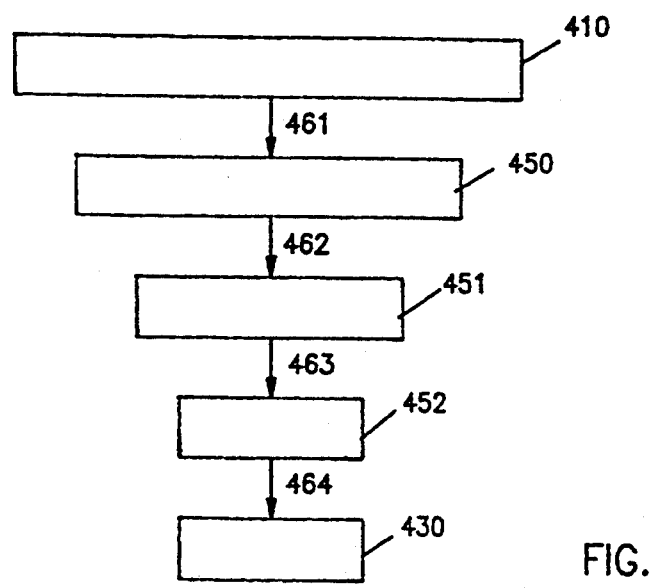
FIG. 7 shows a generalization of the multiplexer circuit of the invention.

In FIG. 7, a first register 410 has a total of n subsections. The second register 430 has m subsections and m contiguous bits from the first register 410 are to be read into the second register 430. A series of logic stages 450-452, connected together and to the first 410 and second 430 registers by lines 461-464, are shown in the FIGURE. For simplicity, the lines 461-464 are not drawn in detail and only three logic stages are shown. However, any number, k, of logic stages can be used as long as k is greater than or equal to two. Each of these logic stages incorporates a number, z(x), of submultiplexers, each of which compresses in the ratio q(x):1, i.e. they each have q(x) inputs and one output, where "x" is a variable from 1 to k. Submultiplexers in different logic stages 450-452 may have different compression ratios. For the invention to function, there must be a minimum number of submultiplexers in each logic stage 450-452 and there must be a minimum number of logic stages. There can, of course, be more than the minimum number of submultiplexers or logic stages. The minimum number of submultiplexers in each stage can be calculated from the following rules:

i) The kth logic stage, i.e. the last logic stage before the second register 430 (shown as logic stage 452 on FIG. 7), contains m submultiplexers.

ii) The (k−1)th logic stage (corresponding to logic stage 451 on FIG. 7), must contain between n and m+q(k)−1 submultiplexers. In the preferred embodiment, the number of multiplexers used is the smaller of these two numbers.

iii) The (k−2)th logic stage must contain between n and m+[q(k)*q(k−1)]−1 submultiplexers. In the preferred embodiment, the number of multiplexers used is smaller of these two numbers.

iv) The second logic stage must contain between n and m+[q(k)*q(k−1)* . . . *q(3)]−1 submultiplexers. In the preferred embodiment, the number of multiplexers used is the smaller of these two numbers.

v) Finally the first logic stage, i.e. the first logic stage after the first register 410 (shown as logic stage 452 on FIG. 7) must contain between n and m+[q(k)*q(k−1)* . . . *q(3)*q(2)]−1. In the preferred embodiment, the number of multiplexers used is the smaller of these two numbers.

The submultiplexers in the logic stages are connected to each other by the following rules:

i) Each of the m submultiplexers in the kth stage has q(k) inputs and is connected to the m+q(k)−1 submultiplexers in the previous, (k−1)th, stage according to the following table:

| Submultiplexer Number | Input number | Number of submultiplexer connected in previous logic stage |
|---|---|---|
| 1 | 1 | 1 |
| 1 | 2 | 2 |
| 1 | 3 | 3 |
| 1 | 4 | 4 |
| . | . | . |
| 1 | q(k) | q(k) |
| 2 | 1 | 2 |
| 2 | 2 | 3 |
| 2 | 3 | 4 |
| 2 | 4 | 5 |
| . | . | . |
| 2 | q(k) | q(k) + 1) |
| 3 | 1 | 3 |
| 3 | 2 | 4 |
| 3 | 3 | 5 |
| 3 | 4 | 6 |
| . | . | . |
| 3 | q(k) | q(k) + 2) |
| m | 1 | m |
| m | 2 | m + 1 |
| m | 3 | m + 2 |
| m | 4 | m + 3 |
| . | . | . |
| m | q(k) | m + q(k) − 1 | ii) Each of the n or m+q(k)−1 multiplexers in the (k−1)th stage have q(k−1) inputs and are connected to the m+[q(k)*q(k−1)]−1 or n submultiplexers in the previous, (k−2)th, stage according to the following table:

| Submultiplexer Number | Input Number | Number of submultiplexer connected in previous logic |
|---|---|---|
| 1 | 1 | 1 |
| 1 | 2 | 1 + q(k) |
| 1 | 3 | 1 + 2q(k) |
| 1 | 4 | 1 + 3q(k) |
| . | . | . |
| 1 | q(k − 1) | 1 + [q(k − 1) − 1]*q(k) |
| 2 | 1 | 2 |
| 2 | 2 | 2 + q(k) |
| 2 | 3 | 2 + 2q(k) |
| 2 | 4 | 2 + 3q(k) |
| . | . | . |
| 2 | q(k − 1) | 2 + [q(k − 1) − 1]*q(k) |
| m + q(k) − 1 | 1 | m + q(k) − 1 |
| m + q(k) − 1 | 2 | m + q(k) − 1 + q(k) |
| m + q(k) − 1 | 3 | m + q(k) − 1 + 2q(k) |
| m + q(k) − 1 | 4 | m + q(k) − 1 + 3q(k) |
| . | . | . |
| m + q(k) − 1 | q(k − 1) | m + q(k) − 1 + [q(k − 1) − 1]*q(k) |

The calculation m+q(k)−1+[q(k−1)−1]*q(k) is carried out modulus |n|, if n is the number of submultiplexers in previous logic stage, as explained below.

iii) In any logic stage, x, the inputs of the ith submultiplexer are connected to the outputs of the submultiplexer in the previous, (x−1)th, logic stage according to the following table:

| Submultiplexer Number | Input Number | Number of submultiplexer connected in previous logic stage |
|---|---|---|
| i | 1 | i |
| i | 2 | i + [q(x + 1)*q(x + 2) ... q(k)] |
| i | 3 | i + 2*[q(x + 1)*q(x + 2) ... q(k)] |
| i | 4 | i + 3*[q(x + 1)*q(x + 2) ... q(k)] |
| . | . | . |
| . | . | . |
| . | . | . |
| i | h | i + (h − 1)*[q(x + 1)*q(x + 2) ... q(k)] |

In this table h represents the number of any input in the ith submultiplexer and $1 \leq h \leq q(x)$.

The calculation $i+(h-1)*[q(x+1)*q(x+2) \ldots q(k)]$ is carried out modulus $|n|$ if n is the number of submultiplexers in the previous logic stage. That is to say that once the result exceeds n, n is subtracted from the result and the hth input of the ith submultiplexer of the xth logic stage connected to the submultiplexer in the (x−1)th logic stage indicated by the new result. An example will serve to illustrate this. Suppose the (x−1)th logic stage has 64 submultiplexers, i.e. n=64, and the result of the calculation $i+(h-1)*[q(x+1)*q(x+2)* \ldots q(k)]$ is 70, then the hth input of the ith submultiplexer will be connected to the submultiplexer number (70−64)=6 in the previous logic stage.

The results of the above calculations apply equally well to the connections between the first logic stage 450 except, of course, that the inputs to the submultiplexers in this logic stage are connected to the outputs of the first register 410. The calculations are therefore carried out modulus $|n|$, where n is the number of subsections in first register 410.

The compression ratios, q(k), of each of the submultiplexers must be chosen to obey the following rule:

$$n < = q(1) * q(2) * \ldots * q(k-1) * q(k) = \prod_{j=1}^{k} q(j)$$

Finally, the above constraints will determine k, the number of logic stages required to develop the multiplexer.

Following these rules, a circuit is developed which in the preferred embodiment does the following:

The first step chooses
the smaller number of n or $m+q(k)*q(k-1)* \ldots *q(2)-1$ from n
The second step chooses
the smaller number of n or $m+q(k)*q(k-1)* \ldots *q(4)*q(3)-1$ from $m+q(k)*q(k-1)* \ldots *q(2)-1$
The (k−2)th step chooses
the smaller number of n or $m+q(k)*q(k-1)-1$ from $m+q(k)*q(k-1)*q(k-2)-1$
The (k−1)th step chooses
the smaller number of n or $m+q(k)-1$ from $m+q(k)*q(k-1)-1$
and, finally, the kth step chooses
m from $m+q(k)-1$ Although the multiplexer has been described in terms of selecting m contiguous bits from n bits, it could be equally well used to select any other type of information units, such as bytes, half words or words, which were contiguous to each other. The corresponding modifications to the circuit would be obvious to a man skilled in the art.

The multiplexer finds applications in an Instruction Buffer in which two contiguous half words are selected from sixteen half words and in cache memories in which four or eight contiguous bytes are selected from sixteen bytes.

While we have described our preferred embodiments of our inventions, it will be understood that those skilled in the art, both now and in the future, upon the understanding of these discussions will make various improvements and enhancements thereto which fall within the scope of the claims which follow. Throughout the claims and the foregoing description we have used reference numerals which refer to the illustrated embodiments as shown in the drawings. These reference numerals should be understood not to limit the scope of our inventions, but to illustrate the preferred embodiments. These claims should be construed to maintain the proper protection for the inventions first disclosed.

What is claimed is:

1. Multiplexer for selecting m contiguous information units stored in m adjacent subsections of a first register containing n subsections and transferring said m information units to a second register containing m subsections, where m is less than n and n is greater than one, said multiplexer comprising:
   k logic stages which each contain z(x) submultiplexers compressing in the ratio q(x):1; wherein
   x is a variable from 1 to k;
   the first logic stage contains between n and $m+(q(k)*q(k-1)* \ldots *q(3)*q(2))-1$ submultiplexers;
   the kth logic stage contains m submultiplexers;
   the xth logic stage contains between n and $m+(q(k)*q(k-1)* \ldots *q([k-]x+1))-1$ submultiplexers for k>x>1;
   the outputs of the kth logic stage submultiplexers are connected to the inputs of the second register;
   the hth input to the ith submultiplexer in the xth logic stage is connected to the output of the $i+(h-1)*(q(x+1)*q(x+2)* \ldots *q(k))[-1]$ submultiplexer in the previous, (x−1)th, logic stage; and
   n is less than or equal to the product $q(1)*q(2)* \ldots *q(k-1)*q(k)$.

2. Multiplexer according to claim 1 wherein
   each submultiplexer contains [q(k)]q(x) AND gates,
   the first inputs of which are connected to the output of one of the submultiplexers in the previous stage and the second input of which is connected to a multiplexer controller,
   and the output of which is connected to an OR gate whose output forms the output of the submultiplexer.

3. Multiplexer according to claim 1 wherein
   the first logic stage contains the smaller of n or $m+(q(k)*q(k-1)* \ldots *q(3)*q(2))-1$ submultiplexers; and
   the xth logic stage contains the smaller of n or $m+(q(k)*q(k-1)* \ldots *q([k-]x+1))-1$ submultiplexers.

4. Multiplexer according to claim 1 wherein the information units may be bits, bytes, half words or words.

5. Multiplexer according to claim 1 wherein
the first register is an instruction buffer for storing a line of instructions and
the second register is a buffer for holding the instruction being implemented.

6. Multiplexer according to claim 5 wherein $m=2$ and $n=16$.

7. Multiplexer according to claim 1 wherein
the first register is a line of a cache memory; and
the second register is a data buffer.

8. Multiplexer according to claim 7 in which $m=8$ and $n=16$.

9. Multiplexer according to claim 7 in which $m=4$ and $n=16$.

10. A multiplexer according to claim 1 wherein said logic stages select a number of adjacent bits, bytes or words from said first register and transfer them in the same order to said second register.

11. The multiplexer of claim 1 wherein the multiplexer forms a part of a cache memory for selecting the required data from a portion of the cache.

12. The multiplexer of claim 1 wherein the multiplexer forms a part of means for selecting the required instruction from an instruction buffer.

* * * * *